Patented Sept. 1, 1931

1,821,290

UNITED STATES PATENT OFFICE

RAINALD BRIGHTMAN, OF BLACKLEY, MANCHESTER, ENGLAND, ASSIGNOR TO IMPERIAL CHEMICAL INDUSTRIES LIMITED, OF LONDON, ENGLAND

MANUFACTURE OF DISAZO DYES

No Drawing. Application filed June 17, 1929, Serial No. 371,730, and in Great Britain June 27, 1928.

According to this invention I have found that new and very valuable acid dyestuffs may be obtained by coupling a sulphonated azo dye component with a 4:4'-diaminodiphenyl body of the general formula:

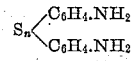

in which $n$ represents 2 or 3; or more specifically by coupling a diazotized 4:4'-diaminodiphenyl di- or tri- sulphide with two molecules of a sulphonated pyrazolone. The new dyestuffs give dyeings on wool which are characterized by being exceptionally fast to alkaline milling, to washing, stoving and to light. The dyestuffs level well and in some cases afford even dyeing effects when dyed on viscose silk of varying qualities. The dyestuff sodium salt is a light brown powder dissolving in water to a clear brownish yellow solution substantially unchanged upon the addition of dilute hydrochloric acid or alkali. It gives a carmine red solution in sulphuric acid turning yellower on addition of water with ultimate formation of a yellowish precipitate.

My new dyestuffs may all be represented by the probable general formula

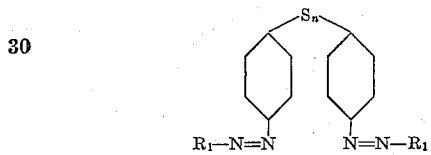

in which $n$ represents 2 or 3 and $R_1$ represents the coupled residue of a sulphonated phenyl pyrazolone the phenyl nucleus of which may be chlorine substituted.

The following examples illustrate the invention without limiting it; the parts are by weight.

Example 1

280 parts of 4:4'-diaminodiphenyl trisulphide, m. p. 122° C. (J. Chem. Soc., 1925, 127, 443) are tetrazotized in the presence of ice with 138 parts of sodium nitrite and 500 parts of 36 per cent hydrochloric acid. The tetrazo compound partly separates and to the yellow suspension there is added a neutral solution containing 508 parts of 1-4'-sulphophenyl-3-methyl-5-pyrazolone. After stirring until coupling is complete the mixture is made alkaline, heated up and the dyestuff isolated by the addition of common salt. It dyes wool in yellow shades which are fast to washing, alkaline milling, stoving and to light.

The dyestuff has the probable formula

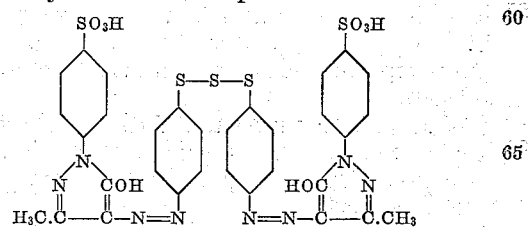

Example 2

248 parts of 4:4'-diaminodiphenyl disulphide, m. p. 78° C. are tetrazotized with 138 parts of sodium nitrite and 500 parts of 36 per cent hydrochloric acid. To the solution of tetrazo compound there is added a neutral solution containing 508 parts of 1:4'-sulphophenyl-3-methyl-5-pyrazolone and 250 parts of sodium acetate crystals. The mixture, which is free from mineral acidity, is stirred until coupling is complete when it is made alkaline and heated up and the dyestuff isolated by the addition of common salt. It dyes wool in yellow shades of good fastness to alkaline milling. Its formula may probably be represented as follows:

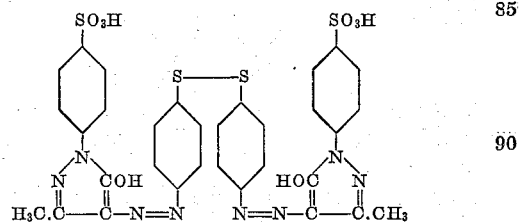

A similar dyestuff is obtained if the 1:4'-sulphophenyl-3-methyl-5-pyrazolone of the above example is replaced by 646 parts of 1(4'-sulpho-2':5'-dichlorophenyl)-3-methyl-5-pyrazolone.

What I claim and desire to secure by Letters Patent is:—

1. The process for the manufacture of new disazo dyestuffs which comprises combining a tetrazotized diaminodiphenyl body of the general formula

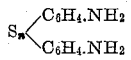

in which $n$ equals 2 or 3, with two molecular proportions of a sulphonated phenyl pyrazolone.

2. In the manufacture of disazo dyestuffs the process which comprises tetrazotizing a diphenyl sulphide represented by the probable formula

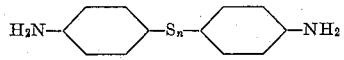

in which $n$ equals 2 or 3, and coupling with a sulphonated phenyl pyrazolone.

3. In the manufacture of disazo dyestuffs the process which comprises tetrazotizing a diphenyl sulphide represented by the probable formula

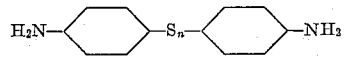

in which $n$ equals 2 or 3, and coupling with 1:4'-sulphophenyl-3-methyl-5-pyrazolone, the phenyl nucleus of which may be chlorine substituted.

4. In the manufacture of disazo dyestuffs the process which comprises tetrazotizing a diphenyl sulphide represented by the probable formula

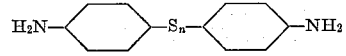

in which $n$ equals 2 or 3, and coupling with 1(4'-sulpho-2':5'-dichlorophenyl)-3-methyl-5-pyrazolone.

5. The process of claim 2 in which $n$ equals 3.

6. The process of claim 3 in which $n$ equals 3.

7. The process of claim 4 in which $n$ equals 2.

8. As new compositions of matter, the disazo dyes represented by the following probable formula

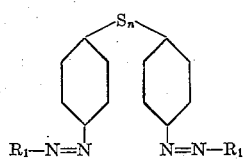

wherein $n$ equals 2 or 3 and $R_1$ represents the coupled residue of a sulphonated phenyl pyrazolone.

9. As new compositions of matter, the disazo dyes represented by the following probable formula

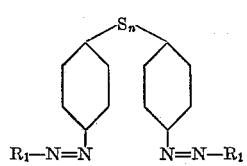

wherein $n$ equals 2 or 3 and $R_1$ represents the coupled residue of 1:4'-sulphophenyl-3-methyl-5-pyrazolone, the phenyl nucleus of which may be chlorine substituted.

10. As new compositions of matter, the disazo dyes represented by the following probable formula

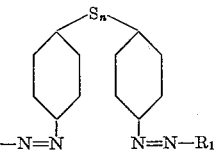

wherein $n$ equals 2 or 3 and $R_1$ represents the coupled residue of 1(4'-sulpho-2':5'-dichlorophenyl)-3-methyl-5-pyrazolone.

11. The products of claim 8 in which $n$ equals 3.

12. The products of claim 9 in which $n$ equals 3.

13. The products of claim 10 in which $n$ equals 2.

14. The composition of matter having the probable formula:

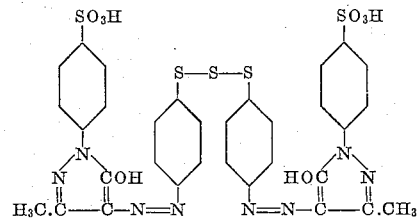

In testimony whereof I affix my signature.
RAINALD BRIGHTMAN.